United States Patent [19]

Park

[11] Patent Number: 5,089,533
[45] Date of Patent: Feb. 18, 1992

[54] OLEFIN POLYMER COMPOSITIONS COMPRISING GLYCEROL MONOESTERS OF $C_{20-24}$ FATTY ACIDS AND FOAMED ARTICLES PREPARED THEREFROM

[75] Inventor: Chung P. Park, Pickerington, Ohio

[73] Assignee: The Dow Chemical Company, Midland, Mich.

[21] Appl. No.: 484,745

[22] Filed: Feb. 26, 1990

[51] Int. Cl.$^5$ .................................... C08J 9/14
[52] U.S. Cl. ........................... 521/79; 521/97; 521/142; 521/143

[58] Field of Search .................. 521/97, 79, 143

[56] References Cited

U.S. PATENT DOCUMENTS 3,644,230  2/1972  Cronin ................................. 521/79

*Primary Examiner*—Morton Foelak

[57] ABSTRACT

Olefin polymer foams prepared utilizing "soft" blowing agents have improved properties when a small amount of a stability control agent comprising a glycerol monoester of a $C_{20-24}$ fatty acid is employed.

11 Claims, No Drawings

OLEFIN POLYMER COMPOSITIONS COMPRISING GLYCEROL MONOESTERS OF $C_{20-24}$ FATTY ACIDS AND FOAMED ARTICLES PREPARED THEREFROM

BACKGROUND OF THE INVENTION

This invention relates to novel olefin polymer compositions, to a process for making foamed or expanded articles therefrom and to foams of these olefin polymer compositions which are characterized, in fresh or non-fully cured form, by improved elevated temperature distortion characteristics. In addition the foamed products prepared from the present compositions possess improved electrostatic dissipation properties.

It is common practice to make closed-cell ethylenic polymer foams by an extrusion foaming process comprising the steps of heat plastifying a thermoplastic ethylenic polymer: admixing the heat plastified polymer under pressure with a volatile material such as a chlorofluorocarbon and passing the resulting mixture through a die opening or shaping orifice into a zone of lower pressure to vaporize the volatile constituent and form a cellular structure which upon cooling forms the corresponding cellular solid ethylenic polymer foam. However, the development of a viable commercial extrusion foaming process—especially for relatively low density foams of lower olefin polymers--requires balancing a number of different (and sometimes competing) business and technical requirements. Accordingly, much of the extrusion foaming technology is empirical, based upon experience and directed to very specific materials and processes to produce specific commercial products.

One of the requirements for acceptable olefin polymer foam products of growing importance is the elevated temperature distortion characteristics of such products in fresh or partially cured form (i.e., the dimensional stability at elevated temperature of the foam prior to sufficient storage or aging to permit substantially complete replacement of the original blowing agent within the cellular structure of the foam with air). Such characteristic is of growing importance because. (a) the elevated temperature distortion characteristics of relatively fresh olefin polymer foams are significantly dependent upon the particular ingredients (e.g., blowing agent, additives, etc.) employed in its preparation: (b) warehousing costs, storage space factors, and/or other considerations oftentimes mandate shipment of the olefin polymer foam products from the manufacturing facility prior to the time that they become fully cured: and (c) such partially cured foam products may, during transport, in enclosed vehicles particularly in warm climates or during hot weather, be subjected to prolonged exposure at relatively high temperatures. Moreover, this concern is even further aggravated by the recent trend toward the use of various stability control agents which provide improved ambient temperature dimensional stability with a wider variety of blowing agents, but which unfortunately also generally lengthen the time required for the olefin polymer foam product to reach its so-called fully cured state.

Additionally, the industry has recently begun using so called "soft" chlorofluorocarbon blowing agents, in particular CFC-142b (1-chloro-1,1-difluoro-ethane), mixtures containing such soft chlorofluoro-carbons or hydrocarbon blowing agents such as isobutane. These compounds have been found to be more readily converted in the environment to decomposition products having reduced deleterious effects. Disadvantageously CFC-142b and isobutane permeate faster through ethylenic polymers than air resulting in foam collapse. To avoid this problem it has become necessary to employ stability control agents to retard the permeation rate of these halocarbon or hydrocarbon blowing agents.

In U.S. Pat. No. 4,368,276 suitable N-substituted fatty acid amides are disclosed for use in polyolefin foams as stability control agents. In certain end uses, such as packaging for sensitive electronic parts, foams must possess electrostatic dissipation properties to prevent an accumulated electrostatic charge on the foam surface from discharging through contact with the electronic part. Although operating effectively for many end uses, it has been discovered that foams prepared utilizing the foregoing N-substituted fatty acid amides do not show measurable improvement in electrostatic dissipation. Moreover, when static control agents such as alkyl amines are added to the formulation the stability control properties of the N-substituted fatty acid amide are adversely affected.

In view of the foregoing, it is an object of this invention to provide olefin polymer foams having, in fresh foam form, good elevated temperature distortion properties as well as to provide olefin polymer compositions which are expandable to form such improved polymer foams Another object of this invention is to provide olefin polymer foams having increased electrostatic dissipation properties. Other objects and advantages of the present invention will be apparent from the description thereof which follows.

SUMMARY OF THE INVENTION

The foregoing and related objectives are attained by the practice of the present invention which, in one aspect, is an olefin polymer composition comprising an olefin polymer and from about 0.1 to about 10 weight percent based upon the olefin polymer of glycerol monoesters of $C_{20-24}$ fatty acids.

In another aspect, the present invention is the above-noted type of olefin polymer composition which further comprises a volatile organic blowing agent and which is thereby expandable to form an expanded article (i.e., a polymer foam) of said olefin polymer composition.

Finally, a particularly beneficial aspect of the present invention resides in a method for substantially improving the elevated temperature distortion characteristics (e.g., dimensional stability at elevated temperatures such as, for example, 150° F., the maximum heat distortion temperature, etc.) of relatively fresh olefin polymer foams by incorporating therein (e.g., during extrusion foaming thereof) from about 0.1 to about 10 weight percent, based upon the olefin polymer, of the above described fatty acid monoesters. The features of the present invention are particularly beneficial when practiced with a blowing agent comprising CFC-142b, or similar soft chlorofluorocarbon; isobutane, or similar hydrocarbon: or mixtures thereof.

DETAILED DESCRIPTION OF THE INVENTION

Olefin polymers suitable for use in the practice of the present invention include homopolymers of ethylene as well as copolymers thereof with other monomers such as propylene, butene-1, 1-octene and other olefins, especially α-olefins, (referred to as linear low density polyethylene); vinyl esters of saturated carboxylic acids such as vinyl acetate, vinyl propionate, and the like: alkyl esters of monoethylenically unsaturated carboxylic acids such as methyl acrylate or methacrylate, ethyl acrylate or methacrylate, propyl acrylate or methacrylate, the several butyl- and isobutyl acrylates and methacrylates, 2-ethylhexyl acrylate, dimethyl maleate and the like: the various monoethylenically unsaturated carboxylic acids themselves such as, for example, acrylic acid, methacrylic acid, etc.: and the like. Polymers of particular interest for use herein are polyethylene, linear low density polyethylene, ethylene-vinyl acetate copolymers and ethylene acrylic acid copolymers. Naturally, blends of 2 or more of the above-noted olefin polymers can also be suitably employed.

As has been noted, a key feature of the present invention resides in the use of a small amount of a glycerol monoester of a $C_{20-24}$ fatty acid in conjunction with the above-described olefin polymers to provide olefin polymer foams having, in fresh foam form, improved distortion characteristics at elevated temperatures. A preferred stability control agent is glycerol monobehenate.

The glycerol monoester of $C_{20-24}$ fatty acid may be present in mixture with other fatty acid esters depending on the purity of fatty acid used to manufacture the same. Typically, monobehenic acid is a hydrogenated rape seed oil containing by weight about 60 percent $C_{22}$ fatty acids, 38 percent $C_{18}$ fatty acids and 2 percent $C_{16-14}$ fatty acids. In addition, as much as 40 percent by weight of the ester mixture may constitute diesters and 15 percent by weight triacid esters in the mixture.

In addition to the above-described fatty acid monoesters, there may also be employed, as auxiliary stability control agents, certain other compounds such as, for example, the higher alkyl amines, the fatty acid esters, the fatty acid amides or N-substituted fatty acids which are described in U.S. Pat. No. 4,214,054, U.S. Pat. No. 3,644,230 or U.S. Pat. No. 4,368,276, the disclosures of which are hereby incorporated by reference. Such additives may be employed in order to obtain an advantageous balance of both ambient temperature and elevated temperature dimensional stability characteristics in the olefin polymer foams prepared therewith.

Additionally, a static dissipation agent may be included in the present composition Such antistatic agents include alkyl amines, ethoxylated alkyl amines, alkenyl amines, and quaternary ammonium compounds which surprisingly do not adversely affect the stability control properties of the present compositions Other additives such as nucleation aids (e.g., talcum powder, sodium bicarbonate, calcium silicate, etc.), colorants, antioxidants, etc. may also be included.

In the practice of the present invention, the above-described fatty acid monoesters are preferably employed in an amount of from about 0.15 to 5 weight percent based upon the weight of the olefin polymer. Moreover, regardless of whether the glycerol monoester of a $C_{20-24}$ fatty acid is employed alone or in combination with the above-noted auxiliary stability control additives, the total level of such additives combined will typically not be in excess of about 10 weight percent based upon the olefin polymer weight and the minimum amount of the compound employed will preferably be an amount sufficient to prevent the fresh foam prepared therewith from shrinking more than 10 percent in volume during prolonged exposure at 150° F.

The expanded olefin polymer articles of the present invention (also referred to herein as olefin polymer foams) can be conveniently prepared using conventional extrusion foaming principles by heat plastifying the desired olefin polymer resin and incorporating into such heat plastified polymer at elevated temperature and pressure (a) a volatile organic blowing agent and (b) from 0.1 to about 10 weight percent (based upon the olefin polymer) of the abovediscussed fatty acid monoester (or a mixture of such ester with one or more of the above-noted auxiliary stability control agents) to form a flowable gel of an expandable olefin polymer composition and thereafter extruding said gel into a zone of lower pressure and temperature to form the desired substantially closed-cell olefin polymer foam.

The volatile organic blowing agent is compounded into the starting olefin polymer resin in proportions suitable to provide the desired degree of expansion in the resulting foamed cellular product, usually up to about a 100-fold volume expansion to make products having aged foam densities down to about 0.009 g/cc (about 0.6 pound per cubic foot). Depending on the starting proportion of blowing agent, the resulting foam products of this invention will typically have densities in the range of from about 0.6 to about 10 pounds per cubic foot (pcf). Preferably, the foam products of the invention are of relatively low density (e.g., in the range of from about 1 to about 6 pcf) and the practice of such invention is especially beneficial for olefin polymer foams having densities in the range of from about 1.0 to about 3 pcf. Typically, the amount of volatile organic blowing agent employed in preparing olefin polymer foams in such density ranges will be in the range of from about 0.02 to about 0.35 gram mole thereof per 100 grams of the olefin polymer employed.

The choice of the specific volatile organic blowing agent selected for use in the present invention is not particularly critical. Indeed, it is a particularly beneficial aspect of the instant invention that the use of the above-described fatty acid monoesters (or their mixtures with the above-noted auxiliary stability control agents) facilitates obtainment of low density olefin polymer foams having commercially desirable properties (e.g., ambient temperature dimensional stability and/or suitable fresh foam elevated temperature distortion characteristics, etc.) with a much broader range of volatile organic blowing agent systems than was heretofore possible. Such volatile organic blowing agents can suitably be employed in the practice of the present invention either alone or in conjunction with thermally decomposable gas-releasing chemical blowing agents or auxiliary blowing agents such as water, carbon dioxide, etc. Preferably, volatile organic blowing agents are employed which have an atmospheric boiling point below the melting point of the olefin polymer employed. Representative of suitable such volatile blowing agents include halogenated hydrocarbon compounds having from 1 to 4 carbon atoms (e.g., trichlorofluoromethane, dichlorodifluoromethane, dichlorofluoromethane, chlorodifluoromethane, 1,1,2-trichlorotrifluoroethane, 1,2-dichlorotetrafluoroethane, 1,1-dichloro -2,2,2 trifluoroethane, 1,1-dichloro-1-fluoroethane, 1-chloro-1,1-difluoroethane 1,1,1,2-tetrafluoroethane, 1-difluoroethane, ethyl chloride, methyl chloride, thylene chloride, etc.) as well as volatile non-halogenated hydrocarbon compounds such as propane, butane, butene, propylene, pentane, etc. Naturally, mixtures of two or more of the foregoing blowing agents can also be suitably employed and, indeed, an especially preferred embodiment of the present invention involves the use of a mixed blowing agent system comprising from about 40 to about 90 weight percent of 1-chloro-1,1-difluoroethane and from about 60 to about 10 weight percent of ethyl chloride, both weight percentages being based upon the total weight of such mixed blowing agent system.

As has been noted, the blowing agent is compounded into the starting olefin polymer in conventional fashion to make a flowable gel, preferably in a continuous manner, e.g., in a mixing extruder, using heat to plastify the normally solid polymer, pressure to maintain the blowing agent in non-gaseous state, and mechanical working to obtain a thorough mixing of the polymer and blowing agent. The resulting gel is then cooled if necessary and passed through a suitable die orifice into a zone of lower pressure, e.g., normal ambient air pressure, where it expands to a lower density, cellular mass. As the extruded product foams, it is taken away from the extruder, allowed to cool to harden the resulting polymer foam and collected for further processing, storage and use.

The resulting olefin polymer foam is comprised of substantially closed-cell structure and, even at low densities and when in fresh foam form, is remarkably stable in dimension at ambient temperature as well as upon exposure to elevated temperatures.

For the present purposes, the dimensional stability of the extrusion foamed products is measured by observing the changes in volume occurring in test specimens of the foam as a function of time of exposure under the environmental circumstances of concern. The test specimens are obtained by quickly cutting, from the extrusion foamed product soon, e.g., within about fifteen minutes, after emerging from the extrusion die orifice, test pieces of the desired dimensions (conveniently, samples about 5 inches long, about 0.5 inch thick and about 1.0 inches wide can be suitably employed) and accurately measuring their overall volume, e.g., by cubic displacement of water. The initial volume of each specimen is arbitrarily selected as the benchmark volume for the subsequent dimensional stability study.

For ambient temperature dimensional stability testing, the individual foam specimens are exposed to air at atmospheric pressure and ordinary room temperature (e.g., 73° F.) and their volumes are measured periodically to determine the minimum volume to which they shrink during the ambient temperature curing process (i.e., "curing" referring to the phenomenon in which the gaseous blowing agent within the foam cells is gradually diffusing out thereof and during which air is gradually diffusing in to replace the escaping blowing agent). For elevated temperature dimensional stability performance evaluation, the above-described ambient temperature procedures are followed except that the specimen is exposed to atmospheric pressure air at elevated temperatures rather than at ambient temperature. The preferred polymer foams of the present invention do not shrink by more than 15 percent from their original volume under prolonged exposure under ambient or elevated temperature test conditions.

In addition, another test employed herein is evaluation of the static dissipating properties of the foam. Test methods include measuring both the surface resistivity (ASTM D-257) and static decay time (Federal Test Standard 101C Method 4046 1).

The specific working examples that follow are intended to illustrate the invention but are not to be taken as limiting its scope. In the examples, parts and percentages are by weight unless otherwise specified or required by the context.

EXAMPLE 1

The equipment used in this example is a 1" screw type extruder having additional zones for mixing and cooling at the end of sequential zones for feeding, metering and mixing. An opening for blowing agent addition is provided on the extruder barrel between the metering and mixing zones. At the end of cooling zone, there is attached a die orifice having an opening of rectangular shape. The height of the opening, hereinafter called die gap, is adjustable while its width is fixed at 3.68 mm (0.145").

One hundred parts of granular low density polyethylene (2.1 melt index, 0.923 g/cc density, was uniformly blended with 2.0 parts of glycerol monobehenate (Kemaster 6500, Humko Chemical Div.) in concentrate form and 0.25 parts of talcum powder. The blend was fed into the extruder at a uniform rate of approximately 6 pounds per hour. The temperatures maintained at the extruder zones were 95° C. at the feeding zone, 150° C. at the melting zone, 180° C. at the metering zone and 200° C. at the mixing zone. CFC-142b (1-chloro-1,1-difluoroethane) was injected under pressure into the mixing zone at a predetermined rate to produce foam of the desired density. The temperature of the cooling zone was maintained so that the polymer/blowing agent mixture could reach an optimum foaming temperature which was in the range of 106° C. plus minus 1° C. The die gap was adjusted in each test to provide a foam strand having smooth skin.

At a die gap ranging from 0.9 mm to 1.1 mm (0.35"-0.45"), there were saved foam samples for determination of foam dimensional stability. The foam strands were of oval shape with approximately 1.1 cm×1.6 cm dimensions and cell sizes ranging from about 0.45 mm to 0.85 mm. From the strand, four 12.7 cm (5") long pieces of foam specimens were cut out and their initial weight and volume were measured within about 5 minutes. Two pieces were aged at ambient temperature and one piece each at 130° F. and 160° F., respectively. The weight and volume of the foam specimens were periodically determined, hourly for the first 6 hours and daily for the first week and then weekly.

The comparative samples were prepared in a similar manner excepting that no stability control agent was added to the polymer melt.

As the data summarized in Table I show, glycerol monobehenate provides foam dimensional stability at temperatures as high as 160° F.

TABLE I

| Run | Foam Density[1] | Foam Dimensional Stability[2] | | |
|---|---|---|---|---|
| | | Ambient Temp. | 130° F. | 160° F. |
| 1 | 32 | 91 | 95 | 95 |
| * | 41 | 72 | ND | ND |

Notes:
*Not an example of this invention
ND = Not determined
[1]Density of cured foam body in kilograms per cubic meter measured two months after extrusion.
[2]Minimum volume of foam body as a percentage of the initial (measured 5 minutes after extrusion) during 2 week aging at specified temperatures.

EXAMPLE 2

The same apparatus, temperature settings, polymer type, stability control agent amount, talc level and solid feed rate as used in Example 1 were employed in the tests of this example In Run 3, 1 percent by weight of an alkyl amine type antistatic agent (Atmer 163 made by ICI Americas) was included. The blowing agent was selected from CFC-142b or its mixture (55/45 mole ratio) with ethyl chloride (Run 4). The blowing agent was fed at a uniform rate of approximately 0.15 pound moles per 100 pounds of polymer throughout the tests of this example. Die openings, foam cross-section sizes and cell sizes fell approximately in the same ranges as for the tests of Example 1.

The test results summarized in Table II indicate that 2.0 parts of glycerol monobehenate per hundred parts of polyethene together with 1 pph Atmer 163 provides adequate static dissipating properties without loss of foam dimensional stability. Advantageously, glycerol monobehenate alone without addition of an antistatic agent, imparts a measurable static dissipating property to the foam. In terms of static decay time per Federal Test Standard 101C method 4046.1, all the foams meet the requirement of the test.

TABLE II

| Run | Blowing Agent Type[1] | Anti-static Agent Level[2] (pph) | Foam Dimensional Stability[3] | | Static Dissipating Properties | |
|---|---|---|---|---|---|---|
| | | | Ambient | 130° F. | Surface[4] Resistivity | Static[5] Decay Time |
| 2 | CFC-142b | — | 91 | 95 | 47.0 | 1.9 |
| 3 | CFC-142b | 1 | 95 | 102 | 3.9 | 0.65 |
| 4 | CFC-142b/EtCl:55/45 | — | 93 | 86 | 24.0 | 1.5 |

[1]CFC-142b = 1-chloro-1,1-difluoroethane CFC-142b/EtCl:55/45 = 55/45 molar mixture of CFC-142b and ethyl chloride
[2]Atmer 163 brand antistatic agent (an alkyl amine type made by ICI Americas Inc.) mixed in per hundred parts of polymer
[3]Minimum volume of foam body as a percentage of the initial (measured 5 minutes after extrusion) during aging at specified temperatures
[4]Surface resistivity in $10^{12}$ ohms per square determined per ASTM D-257
[5]Static decay time in seconds determined per Federal Test Standard 101C Method 4046.1.

EXAMPLE 3

Substantially the same resin blend as employed in Example 1 is extruded and foamed by means of a 1½' screw type extruder having essentially the same configuration as the equipment used in Example 1 operating at substantially the same extrusion conditions. There is attached a die orifice having a rectangular opening of 6.35 mm (0.25')×1.27 mm (0.05").

One hundred parts of the low density polyethylene resin were blended with 1.4 parts of glycerol monobehenate and 0.35 parts of a nucleating agent mixture, (a mixture of sodium bicarbonate and citric acid in polyethylene, Hydrocerol ® CF-20, available from Berlinger Ingelheim). The blend was fed into the extruder at a uniform rate of 10 pounds per hour Isobutane was injected into the extruder at a rate of 0.84 pounds per hour. At the foaming gel temperature of 110° C., there was achieved a good quality foam having 33 kg/m³ density, 1.5 mm cell size and 1 cm×3.2 cm cross-section. From the foam strand, 10 cm (4") long pieces were cut and subjected to similar dimensional stability tests as in Example 1.

The data summarized in Table III indicates that glycerol monobehenate provides desired dimensional stability for a polyethylene foam expanded with isobutane blowing agent.

TABLE III

| Run | Foam Density[1] | Foam Dimensional Stability[2] | | |
|---|---|---|---|---|
| | | Ambient Temp. | 150° F. | 160° F. |
| 6 | 33 | 98 | 94 | 89 |

[1]Density of cured foam body in kilograms per cubic meter measured 7 days after extrusion.
[2]the same as in Table 1.

What is claimed is:

1. An expandable olefin polymer composition comprising an olefin polymer, a volatile organic blowing agent and from about 0.1 to about 10 weight percent based upon the weight of said olefin polymer of glycerol monoester of a $C_{20-24}$ fatty acid.

2. The expandable composition of claim 1, wherein the volatile organic blowing agent is selected from halogenated hydrocarbon compounds having from 1 to 4 carbon atoms, isobutane, and mixtures thereof.

3. The expandable composition of claim 2, wherein the volatile organic blowing agent comprises 1-chloro-1,1-difluoroethane.

4. The expandable composition of claim 2, wherein the volatile organic blowing agent comprises isobutane.

5. The expandable composition of claim 2, wherein the volatile organic blowing agent is employed in an amount of from about 0.02 to about 0.35 gram-mole of such blowing agent per 100 grams of the olefin polymer component thereof.

6. The expandable composition of claim 3, wherein the blowing agent comprises from about 40 to about 90 weight percent of 1-chloro-1,1-difluoroethane and from about 60 to about 10 weight percent of ethyl chloride.

7. The expandable composition of claim 1 wherein the fatty acid ester comprises glycerol monobehenate.

8. The expandable composition of claim 1 which further comprises an auxiliary stability control agent selected from the group consisting of (a) higher alkyl amines, (b) fatty acid esters, (c) fatty acid amides and N-substituted fatty acid amides wherein the combined weight of such auxiliary stability control agent and the glycerol monoester is no more than about 10 weight percent based upon the weight of the olefin polymer.

9. The expandable composition of claim 1 additionally comprising an antistatic agent.

10. An expanded article of an olefin polymer comprising a substantially closed-cell foam having a density of from about 0.6 to about 10 pounds per cubic foot and being composed of a polymer composition comprising (a) an olefin polymer and (b) from about 0.1 to about 10 weight percent based upon the weight of said olefin polymer of a glycerol monoester of a $C_{20-24}$ fatty acid.

11. A process for preparing a substantially closed-cell olefin polymer foam which comprises incorporating, at elevated temperature and pressure, into a heat-plastified olefin polymer (a) from about 0.1 to about 10 weight percent, based upon the olefin polymer weight, of a glycerol monoester of a $C_{20-24}$ fatty acid and (b) from about 0.02 to about 0.35 gram-mole, per 100 grams of olefin polymer, of a volatile organic blowing agent to thereby form a flowable gel of an expandable olefin polymer composition and thereafter extruding said gel into a zone of lower pressure to thereby form said substantially closed-cell olefin polymer foam

* * * * *